(12) United States Patent
Stripling (10) Patent No.: US 9,015,005 B1
(45) Date of Patent: Apr. 21, 2015

(54) DETERMINING, DISPLAYING, AND USING TAPE DRIVE SESSION INFORMATION

(75) Inventor: Jeffrey R. Stripling, Austin, TX (US)

(73) Assignee: KIP CR P1 LP, New York, NY (US)

( * ) Notice: Subject to any disclaimer, the term of this patent is extended or adjusted under 35 U.S.C. 154(b) by 1463 days.

(21) Appl. No.: 12/025,300

(22) Filed: Feb. 4, 2008

(51) Int. Cl.
| | |
|---|---|
| G06F 11/30 | (2006.01) |
| G06F 11/34 | (2006.01) |
| G06F 11/07 | (2006.01) |
| G11B 15/68 | (2006.01) |
| G11B 17/22 | (2006.01) |

(52) U.S. Cl.
CPC .......... *G06F 11/0727* (2013.01); *G11B 15/689* (2013.01); *G06F 11/079* (2013.01); *G11B 17/228* (2013.01)

(58) Field of Classification Search
CPC ............ G06F 11/0727; G06F 11/3485; G06F 11/079; G11B 15/689; G11B 17/228
USPC ................ 702/186; 710/18; 340/635; 714/42
See application file for complete search history.

(56) References Cited

U.S. PATENT DOCUMENTS

| | | | |
|---|---|---|---|
| 3,704,363 A * | 11/1972 | Salmassy et al. ............. | 714/704 |
| 3,984,923 A | 10/1976 | Rawson et al. | |
| 4,754,345 A | 6/1988 | Karlstetter | |
| 4,932,826 A | 6/1990 | Moy et al. | |
| 4,958,235 A | 9/1990 | Sims et al. | |
| 5,253,126 A | 10/1993 | Richmond | |
| 5,309,768 A | 5/1994 | Mathews et al. | |
| 5,386,324 A | 1/1995 | Fry et al. | |
| 5,668,800 A | 9/1997 | Stevenson | |
| 5,781,703 A | 7/1998 | Desai et al. | |
| 5,822,516 A | 10/1998 | Krech, Jr. | |
| 5,881,221 A | 3/1999 | Hoang et al. | |
| 5,883,864 A | 3/1999 | Saliba | |
| 6,052,264 A | 4/2000 | Curtis | |
| 6,052,341 A | 4/2000 | Bingham et al. | |

(Continued)

FOREIGN PATENT DOCUMENTS

| | | |
|---|---|---|
| EP | 0726570 | 8/1996 |
| GB | 2419198 | 4/2006 |

OTHER PUBLICATIONS

International Search Report and Written Opinion for International Patent Application No. PCT/US2011/021517, mailed Apr. 19, 2011, 12 pgs.

(Continued)

*Primary Examiner* — Jonathan C Teixeira Moffat
*Assistant Examiner* — Regis Betsch
(74) *Attorney, Agent, or Firm* — Sprinkle IP Law Group (57) ABSTRACT

Methods and systems for monitoring libraries and library drives. In one embodiment, a method is provided which includes polling the library to determine whether a storage media has been loaded in to, or unloaded from, a drive. When the media has been loaded, the method includes beginning a media monitoring session. The method may include determining which tape has been loaded in to which drive of the library and associating the session performance with that tape and that drive. Some embodiments include using a Read Element Status command to perform the polling. In some examples, the library is a magnetic tape library and the polling is performed out-of-band. Information regarding the media sessions can be output in order of session performance. Some embodiments include determining whether the cause of a slow session is external to the library and correcting the external cause.

27 Claims, 6 Drawing Sheets

(56) References Cited

U.S. PATENT DOCUMENTS

| | | | |
|---|---|---|---|
| 6,163,853 A | 12/2000 | Findlay et al. | |
| 6,269,330 B1 | 7/2001 | Cidon et al. | |
| 6,304,880 B1 | 10/2001 | Kishi | |
| 6,490,253 B1 | 12/2002 | Miller et al. | |
| 6,624,958 B1 | 9/2003 | Alva | |
| 6,715,031 B2 | 3/2004 | Camble et al. | |
| 6,725,394 B1 | 4/2004 | Bolt | |
| 6,799,156 B1 | 9/2004 | Rieschl et al. | |
| 6,823,401 B2* | 11/2004 | Feather et al. | 710/18 |
| 6,839,824 B2 | 1/2005 | Camble et al. | |
| 6,950,871 B1 | 9/2005 | Honma et al. | |
| 6,971,046 B1 | 11/2005 | Johnson et al. | |
| 7,076,391 B1 | 7/2006 | Pakzad et al. | |
| 7,200,546 B1 | 4/2007 | Nourmohamadian et al. | |
| 7,200,722 B2 | 4/2007 | Goodman | |
| 7,310,745 B2 | 12/2007 | Schnapp et al. | |
| 7,346,801 B2 | 3/2008 | Brunelle et al. | |
| 7,386,667 B2 | 6/2008 | Estelle et al. | |
| 7,443,801 B2 | 10/2008 | Neidhardt et al. | |
| 7,444,469 B2 | 10/2008 | Estelle et al. | |
| 7,483,810 B2 | 1/2009 | Jackson et al. | |
| 7,492,720 B2 | 2/2009 | Pruthi et al. | |
| 7,573,664 B2 | 8/2009 | Bentley et al. | |
| 7,583,604 B2 | 9/2009 | Couturier | |
| 7,596,096 B2 | 9/2009 | Crawford et al. | |
| 7,627,786 B2* | 12/2009 | Bello et al. | 714/42 |
| 7,653,840 B1 | 1/2010 | Taylor et al. | |
| 7,809,990 B2 | 10/2010 | Sasaki | |
| 7,885,805 B2 | 2/2011 | Dickens et al. | |
| 7,908,366 B2 | 3/2011 | Sims | |
| 7,971,006 B2 | 6/2011 | Justiss et al. | |
| 7,974,215 B1 | 7/2011 | Sims | |
| 8,035,911 B2 | 10/2011 | Ballard et al. | |
| 8,108,544 B2 | 1/2012 | Ramakrishnan et al. | |
| 8,117,501 B2 | 2/2012 | Taniyama et al. | |
| 8,145,572 B2 | 3/2012 | Ito | |
| 8,180,824 B2 | 5/2012 | McCoy et al. | |
| 8,195,986 B2 | 6/2012 | Meaney et al. | |
| 8,495,432 B2 | 7/2013 | Dickens et al. | |
| 8,631,127 B2 | 1/2014 | Sims | |
| 8,631,281 B1 | 1/2014 | Stripling et al. | |
| 8,639,807 B2 | 1/2014 | Sims | |
| 8,644,185 B2 | 2/2014 | Sims | |
| 8,645,328 B2 | 2/2014 | Sims | |
| 8,650,241 B2 | 2/2014 | Moody, II et al. | |
| 8,832,495 B2 | 9/2014 | Foster et al. | |
| 8,843,787 B1 | 9/2014 | Foster et al. | |
| 8,949,667 B2 | 2/2015 | Foster et al. | |
| 2001/0039579 A1 | 11/2001 | Trcka et al. | |
| 2001/0040748 A1 | 11/2001 | Nagai et al. | |
| 2002/0006004 A1 | 1/2002 | Miyamura | |
| 2002/0055999 A1 | 5/2002 | Takeda | |
| 2003/0070053 A1 | 4/2003 | Gallo et al. | |
| 2003/0097439 A1 | 5/2003 | Strayer et al. | |
| 2003/0126395 A1 | 7/2003 | Camble et al. | |
| 2003/0128448 A1 | 7/2003 | Gunderson et al. | |
| 2003/0225865 A1 | 12/2003 | Koestler | |
| 2003/0233431 A1 | 12/2003 | Reddy et al. | |
| 2004/0022263 A1* | 2/2004 | Zhao et al. | 370/461 |
| 2004/0078697 A1 | 4/2004 | Duncan | |
| 2004/0139195 A1 | 7/2004 | Feather, Jr. et al. | |
| 2004/0139240 A1 | 7/2004 | DiCorpo et al. | |
| 2004/0168102 A1 | 8/2004 | Tsunoda | |
| 2005/0044451 A1* | 2/2005 | Fry et al. | 714/38 |
| 2005/0052772 A1 | 3/2005 | Barbian et al. | |
| 2005/0076263 A1 | 4/2005 | Tomita | |
| 2005/0086554 A1 | 4/2005 | Simes | |
| 2005/0091369 A1 | 4/2005 | Jones | |
| 2005/0138195 A1 | 6/2005 | Bono | |
| 2005/0149829 A1* | 7/2005 | Lee | 714/776 |
| 2005/0174869 A1* | 8/2005 | Kottomtharayil et al. | 365/222 |
| 2005/0210161 A1 | 9/2005 | Guignard et al. | |
| 2005/0231846 A1 | 10/2005 | Winarski et al. | |
| 2005/0246376 A1 | 11/2005 | Lu et al. | |
| 2005/0246509 A1 | 11/2005 | Topham et al. | |
| 2005/0262231 A1 | 11/2005 | Lowe et al. | |
| 2006/0085595 A1 | 4/2006 | Slater | |
| 2006/0092850 A1 | 5/2006 | Neidhardt et al. | |
| 2006/0126211 A1 | 6/2006 | Sasaki | |
| 2006/0170238 A1 | 8/2006 | Justiss et al. | |
| 2006/0174071 A1 | 8/2006 | Justiss et al. | |
| 2006/0190205 A1 | 8/2006 | Klein et al. | |
| 2006/0242489 A1 | 10/2006 | Brockway et al. | |
| 2007/0025008 A1* | 2/2007 | Ballard | 360/69 |
| 2007/0067678 A1 | 3/2007 | Hosek et al. | |
| 2007/0079048 A1 | 4/2007 | Starr et al. | |
| 2007/0106840 A1 | 5/2007 | Estelle | |
| 2007/0226336 A1* | 9/2007 | Katagiri et al. | 709/224 |
| 2007/0253088 A1 | 11/2007 | Clarke et al. | |
| 2007/0255920 A1 | 11/2007 | Gold | |
| 2007/0294591 A1 | 12/2007 | Usynin et al. | |
| 2008/0019283 A1 | 1/2008 | Emile | |
| 2008/0098168 A1 | 4/2008 | Estelle | |
| 2008/0109547 A1 | 5/2008 | Bao et al. | |
| 2008/0115015 A1 | 5/2008 | Ikezawa et al. | |
| 2008/0259809 A1 | 10/2008 | Stephan et al. | |
| 2008/0282265 A1 | 11/2008 | Foster et al. | |
| 2009/0044047 A1 | 2/2009 | Bates et al. | |
| 2009/0059757 A1 | 3/2009 | Haustein et al. | |
| 2009/0070092 A1 | 3/2009 | Dickens et al. | |
| 2009/0106816 A1 | 4/2009 | Ito | |
| 2009/0113129 A1 | 4/2009 | Deicke et al. | |
| 2009/0177314 A1 | 7/2009 | Greco et al. | |
| 2009/0198650 A1 | 8/2009 | Sims | |
| 2009/0198737 A1 | 8/2009 | Sims | |
| 2009/0199045 A1 | 8/2009 | Kasubuchi et al. | |
| 2010/0023604 A1 | 1/2010 | Verma et al. | |
| 2010/0033863 A1 | 2/2010 | Fry et al. | |
| 2010/0125740 A1 | 5/2010 | Grechanik | |
| 2010/0182887 A1 | 7/2010 | Moody et al. | |
| 2010/0228805 A1 | 9/2010 | McCoy et al. | |
| 2010/0250698 A1 | 9/2010 | Haustein et al. | |
| 2010/0275219 A1 | 10/2010 | Carlson et al. | |
| 2011/0194451 A1 | 8/2011 | Sims | |
| 2012/0185589 A1 | 7/2012 | Sims | |
| 2012/0221597 A1 | 8/2012 | Sims | |
| 2014/0085744 A1 | 3/2014 | Stripling et al. | |
| 2014/0095815 A1 | 4/2014 | Sims | |
| 2014/0112118 A1 | 4/2014 | Moody, II et al. | |
| 2014/0112185 A1 | 4/2014 | Sims | |
| 2014/0122438 A1 | 5/2014 | Sims | |
| 2014/0325284 A1 | 10/2014 | Foster et al. | |
| 2014/0359369 A1 | 12/2014 | Foster et al. | |

OTHER PUBLICATIONS

International Preliminary Report on Patentability (Ch. I) for International Application No. PCT/US2009/032402, issued on Aug. 3, 2010, 7 pgs.

International Preliminary Report on Patentability (Ch. I) for International Application No. PCT/US2009/032390, issued on Aug. 10, 2010, 7 pgs.

International Preliminary Report on Patentability (Ch. II) for International Patent Application No. PCT/US08/63227, mailed Oct. 31, 2011, Patent Cooperation Treaty, 25 pgs.

Corrected International Preliminary Report on Patentability (Ch. II) for International Patent Application No. PCT/US08/63227, mailed Feb. 2, 2012, Patent Cooperation Treaty, 22 pgs.

Notice of Allowance for U.S. Appl. No. 11/801,809, mailed Jun. 20, 2013, 4 pgs.

Notice of Allowance for U.S. Appl. No. 14/324,980, mailed Aug. 25, 2014, 6 pgs.

Notice of Allowance for U.S. Appl. No. 12/024,755, mailed Dec. 10, 2010, 16 pgs.

Notice of Allowance for U.S. Appl. No. 13/430,429, mailed Aug. 1, 2013, 3 pgs.

Notice of Allowance for U.S. Appl. No. 13/459,720, mailed Aug. 5, 2013, 3 pgs.

Notice of Allowance for U.S. Appl. No. 12/692,403, mailed Aug. 16, 2013, 3 pgs.

Notice of Allowance for U.S. Appl. No. 11/801,809, mailed Aug. 22, 2013, 5 pgs.

(56) References Cited

OTHER PUBLICATIONS

Office Action for U.S. Appl. No. 12/888,954, mailed Aug. 23, 2013, 16 pgs.
Office Action for U.S. Appl. No. 12/861,609, mailed Sep. 6, 2013, 11 pgs.
Notice of Allowance for U.S. Appl. No. 12/861,612, mailed Sep. 30, 2013, 12 pgs.
Notice of Allowance for U.S. Appl. No. 12/025,436, mailed Oct. 4, 2013, 5 pgs.
Notice of Allowance for U.S. Appl. No. 13/091,877, mailed Oct. 8, 2013, 5 pgs.
Notice of Allowance for U.S. Appl. No. 13/430,429, mailed Oct. 30, 2013, 3 pgs.
Notice of Allowance for U.S. Appl. No. 13/459,720, mailed Oct. 30, 2013, 3 pgs.
Office Action for U.S. Appl. No. 12/861,609, mailed Jan. 4, 2013, 12 pgs.
Office Action for U.S. Appl. No. 12/861,612, mailed Nov. 27, 2012, 12 pgs.
Office Action for U.S. Appl. No. 12/888,954, mailed Dec. 13, 2012, 14 pgs.
Office Action issued in U.S. Appl. No. 12/025,436, mailed Mar. 30, 2010, 15 pgs.
Office Action for U.S. Appl. No. 11/801,809, mailed Jun. 7, 2011, 16 pgs.
Office Action for U.S. Appl. No. 12/025,436, mailed Mar. 11, 2011, 25 pgs.
Office Action for U.S. Appl. No. 12/025,436, mailed Nov. 9, 2012, 34 pgs.
Office Action for U.S. Appl. No. 12/025,436, mailed Aug. 22, 2011, 36 pgs.
Office Action issued in U.S. Appl. No. 12/024,755, mailed Jun. 23, 2010, 11 pgs.
Office Action issued in U.S. Appl. No. 12/025,322, mailed Jul. 8, 2010, 15 pgs.
Office Action for U.S. Appl. No. 11/801,809, mailed Feb. 16, 2011, 23 pgs.
Notice of Allowance for U.S. Appl. No. 12/025,322, mailed Feb. 17, 2011, 8 pgs.
Office Action for U.S. Appl. No. 11/801,809, mailed Dec. 17, 2013, 8 pgs.
Notice of Allowance for U.S. Appl. No. 12/861,609, mailed Feb. 5, 2014, 3 pgs.
Notice of Allowance for U.S. Appl. No. 11/801,809, mailed Mar. 25, 2014, 4 pgs.
Office Action for U.S. Appl. No. 14/143,046, mailed May 7, 2014, 18 pgs.
Office Action for U.S. Appl. No. 14/099,591, mailed Jun. 2, 2014, 13 pgs.
Notice of Allowance for U.S. Appl. No. 11/801,809, mailed Jun. 27, 2014, 4 pgs.
Office Action issued in U.S. Appl. No. 12/025,436, mailed Sep. 15, 2010, 21 pgs.
"SCSI DDS Tape Expert Tool (mstm Online Help)," Hewlett Packard, 2002 http://docs.hp.com/hpux/onlinedocs/diag/stm/help/expert/scsi_ddsm.htm, 8 pages.
Office Action issued in U.S. Appl. No. 11/801,809, mailed Sep. 23, 2010, 31 pgs.
Office Action for U.S. Appl. No. 13/459,720, mailed Aug. 1, 2012, 16 pgs.
Office Action for U.S. Appl. No. 13/430,429, mailed Aug. 2, 2012, 15 pgs.
Office Action for U.S. Appl. No. 12/861,609, mailed Aug. 7, 2012, 10 pgs.
Office Action for U.S. Appl. No. 13/091,877, mailed Oct. 11, 2012, 14 pgs.
Office Action for U.S. Appl. No. 12/692,403, mailed Feb. 20, 2013, 35 pgs.
IBM et al., Hardware and Volume Statistical Analysis and Reporting System for Detecting and Isolating Media and Hardware Errors on the Magstar Family of Tape Drives, Dec. 1, 1999, 4 pgs (IP.com No. IPCOM000013086D).
International Preliminary Report on Patentability (Ch. I) for International Patent Application No. PCT/US2011/021517, mailed Aug. 2, 2012, 8 pgs.
Notice of Allowance for U.S. Appl. No. 13/091,877, mailed Feb. 27, 2013, 10 pgs.
Notice of Allowance for U.S. Appl. No. 12/025,436, mailed Mar. 8, 2013, 10 pgs.
Office Action for U.S. Appl. No. 11/801,809, mailed Mar. 27, 2013, 13 pgs.
Notice of Allowance for U.S. Appl. No. 13/459,720, mailed May 7, 2013, 2 pages.
Notice of Allowance for U.S. Appl. No. 13/430,429, mailed May 14, 2013, 4 pgs.
Notice of Allowance for U.S. Appl. No. 12/692,403, mailed May 14, 2013, 5 pgs.
Office Action for U.S. Appl. No. 12/861,612, mailed Jun. 11, 2013, 12 pgs.
Notice of Allowance for U.S. Appl. No. 13/091,877, mailed Jun. 11, 2013, 7 pgs.
Weber (ed.) Information Technology—SCSI Primary Commands—4 (SPC-4), Project T10/1731-D, rev. 2, Sep. 15, 2005.
Penokie (ed.) Information Technology—SCSI Block Commands—3 (SBC-3), T10/1799-D, Rev. 6, Jul. 24, 2006.
Weber (ed.) Information Technology—SCSI Primary Commands—4 (SPC-4), Project T10/1731-D, rev. 10, Apr. 21, 2007.
Weber (ed.) Information Technology—SCSI Primary Commands—3 (SPC-3), Project T10/1416-D, rev. 22a, Mar. 25, 2005.
Oetting (ed.) Information Technology—SCSI Media Changer Commands—2 (SMV-2), Incits T10 Project 1383D, rev. 7, Nov. 18, 2003.
International Search Report and Written Opinion mailed Aug. 29, 2008 for International Patent Application No. PCT/US2008/63227, 7 pgs.
International Search Report and Written Opinion mailed Jun. 29, 2009 for International Patent Application No. PCT/US2009/032402.
International Search Report and Written Opinion completed Jun. 26, 2009, mailed Jul. 3, 2009, for International Patent Application No. PCT/US2009/032390, 13 pgs.
Paul Boehler, "Common SCSI/ATAPI Command Set for Streaming Tape" QIC 157, Revision D, Dec. 13, 1995, 50 pgs.
Office Action issued in U.S. Appl. No. 12/025,322, mailed Dec. 30, 2009, 11 pgs.
Office Action for U.S. Appl. No. 14/099,591, mailed Oct. 1, 2014, 5 pgs.
Corrected Notice of Allowability for U.S. Appl. No. 14/324,980, mailed Oct. 24, 2014, 4 pgs.
Office Action for U.S. Appl. No. 14/464,034, mailed Nov. 5, 2014, 8 pgs.
Notice of Allowance for U.S. Appl. No. 14/324,980, mailed Nov. 24, 2014, 5 pgs.
Notice of Allowance for U.S. Appl. No. 14/143,046, mailed Dec. 18, 2014, 8 pgs.
Notice of Allowance for U.S. Appl. No. 14/464,034 mailed Dec. 19, 2014, 2 pgs.
Office Action for U.S. Appl. No. 14/092,729, mailed Dec. 24, 2014, 8 pgs.
Office Action for U.S. Appl. No. 12/888,954, mailed Jan. 5, 2015, 15 pgs.
Notice of Allowance for U.S. Appl. No. 14/143,046, mailed Feb. 12, 2015, 10 pgs.
Office Action for U.S. Appl. No. 14/574,077, mailed Feb. 25, 2015, 15 pgs.
Notice of Allowance for U.S. Appl. No. 14/099,591, mailed Feb. 27, 2015, 10 pgs.

* cited by examiner

DETERMINING, DISPLAYING, AND USING TAPE DRIVE SESSION INFORMATION

TECHNICAL FIELD OF THE INVENTION

The present disclosure relates to methods and systems for monitoring storage components. More particularly, an embodiment relates to methods and systems for monitoring library performance by identifying library tape sessions in a non-intrusive manner using an out-of-band appliance.

BACKGROUND

Data represents a significant asset for many entities. Consequently, data loss, whether accidental or caused by malicious activity, can be costly in terms of wasted manpower, loss of goodwill from customers, loss of time and potential legal liability. To ensure proper protection of data for business and legal purposes, many entities back up data to a physical storage media such as magnetic tapes or optical disks. Traditionally, backup would occur at each machine controlled by an entity. As the sophistication of network technology increased, many entities turned to enterprise level backup in which data from multiple machines on a network is backed up to a remote library. Typically, a library includes a variety of components which include a plurality of media for data storage, e.g. multiple magnetic tapes. Centralized data backup has the advantage of increased volume, efficiency, and redundancy.

In many systems, the data to be backed up and backup commands are sent over a network from multiple machines on the network to a library. In many instances, the data to be backed up and the backup commands are routed to the library through a switch.

One example of a library commonly used in enterprise backup systems is a magnetic tape library. A magnetic tape library can comprise components such as tape cartridges (containing magnetic tape), robots, tape slots and tape drives. A typical magnetic tape library contains multiple cartridge slots in which tape cartridges can be stored. Tape cartridges, commonly referred to as tapes, are physically moved between cartridge slots and tape drives by a robot. The robot is controlled by commands received from the host devices on the network. When specific data is required, a host device determines which cartridge slot contains the tape cartridge that holds the desired data. The host device then transmits a move-element command to the robot and the robot moves the tape cartridge to a tape drive which reads the desired data from the tape cartridge.

In a SCSI tape library, devices that are part of the library are typically addressed by target number. Thus, each drive and robot of a tape library typically has a target number. Cartridge slots, on the other hand, are addressed by element numbers that are used by the robot to locate the slots. Because the robot also places tape cartridges in the drives, each drive is also associated with an element number.

Components of a library are subject to wear and other forms of degradation which may degrade individual library component(s) to a point where the degraded component(s) can no longer be reliably used. Degradation of library components may render a library unreliable and prone to data loss, diminishing the library's usefulness as a backup device. The failing of even one library component can cause the loss of valuable data. Furthermore, the process of determining which library component is failing and rendering the library unreliable can be time consuming, uncertain and expensive. Networks and other equipment external to the library may also affect the performance of the library. For instance, if data is being backed up from a remote location, transport delays and interruptions along the transmission path may cause the data to arrive relatively slowly (or not at all) at the library. While the library may store the data just as fast as it arrives, the performance of the library suffers because the storage rate in these circumstances is nonetheless slow.

SUMMARY

Embodiments disclosed provide methods and systems of monitoring library performance that eliminate, or at least substantially reduce, the shortcomings of prior art library systems and methods. Some embodiments include polling a library to determine whether a media (e.g., tape, optical disk, or other media) has been loaded or unloaded between polls. When it is discovered that a media has been loaded a media session is begun. Performance data (e.g., data transfer speed, error rates, etc) associated with the media session is monitored. When it is determined that the tape has been unloaded, the media session ends. Information regarding the media session (for instance, performance related information, can be output and stored for subsequent use.

Back up system topologies vary widely. For instance, in some embodiments, data may flow to the back up system, its library(s), and drive(s) from multiple points of a network. In many back up systems, each tape may be placed in any drive capable of reading that tape and any drive may be used to read any compatible tape in the library. During a back up job, and over the course of time, an individual tape may be loaded in to many different drives and an individual drive may have many different tapes loaded in to it. These factors may contribute to, mask, or have little effect on the cause(s) of differing library performance between tape sessions. For instance, jobs (e.g., a data write to the tape or a data read from the tape) associated with a particular tape might suffer comparatively low library performance in which case the tape becomes suspect. In other circumstances, jobs associated with a particular drive might suffer comparatively low library performance in which case the drive becomes suspect. In other cases, the low performance jobs may exhibit no apparent pattern with regard to either the tapes or the drives in which case it may be useful to associate the low performance with the tape session rather than the tape or the drive involved. Users and owners of storage area networks, back up systems, libraries, drives, tapes, and the data thereon are interested in knowing the performance of these systems as a whole as well as the individual components of these systems. This knowledge can aid in troubleshooting failures, troubleshooting slow performing sessions, and in optimizing system performance and utilization.

The methods of some embodiments monitor the performance of back up systems, libraries, and operations and associate information with identified tape sessions. A tape session can begin when a tape is loaded in to a drive and can continue until the tape is unloaded. Information can be collected regarding the tape session to allow a user to optimize the performance and utilization of the systems and components involved. The methods of some embodiments gather information such as the amount of data transferred per time period, the types and numbers of errors occurring during a time period, and the identities of the tapes and drives used during a time period. The gathered information can allow interested parties to understand and improve the performance and utilization of the back up system.

In some embodiments that use a robot (or other automated tape handling mechanism) to load and unload tapes in a library, the library can be periodically polled to determine the position of the tapes in the library. Information from consecutive polls can be examined and used to generate a list of tape movements in the library. For instance, if a tape in a first poll was not in a tape drive and the tape upon a second poll is in a tape drive, the beginning of a tape session may be declared. If a tape was in a tape drive in a first poll and the tape is not in the tape drive upon a second poll, the end of a tape session can be declared. In some embodiments, the system can use the SCSI Read Element Status command to implement the polls.

In some embodiments without automatic tape handling mechanisms (e.g., embodiments which include a freestanding tape drive) the tape drive can be periodically polled to determine if a tape has been loaded in to any of the drives. By examining differences between consecutive polls, a list of tape movements in to and out of the tape drives can be generated. If a tape drive in a first poll reported that no tape was in the drive and the drive reports that a tape is in the tape drive upon a second poll, the beginning of a tape session can be declared. If a tape drive in a first poll reported that a tape was in the drive and the drive reports that no tape is in the tape drive upon a second poll, the end of the tape session can be declared. In some embodiments, the SCSI Read Media Serial Number command can be used to implement the polls.

During the tape sessions, in some embodiments, information can be gathered regarding the session. Examples of such information include, but are not limited to, the amount of data written and read, the number of errors encountered, and the start and end times of the session. The gathered information can be stored in a database and additional information can be gathered or calculated. Examples of calculated information include (but are not limited to) the duration and the average data transfer rate of the tape sessions. Additional measurements of system performance can also be gathered or derived.

The tape drive and the tape used for a given tape session can be identified in some embodiments. Information can be gathered during the tape sessions and can be associated with the tape drive, the tape, the tape session, or any combination thereof. In some embodiments, a list of tape sessions grouped by tape drives, a collection of tape drives, tapes, time periods, or other considerations can be displayed. For example, errors can be grouped by tape session and can be used to pinpoint the source of problems associated with the tape drives and tapes in use for the tape sessions. Some embodiments provide informational listings of tape sessions. Users can examine the listings to determine whether particular tape sessions were the source of most performance issues or whether the performance issues correspond to some other phenomenon. Information can be gathered that may be useful in distinguishing between low performance tapes, tape drives, and tape sessions.

Some embodiments provide outputs such as user selected tables of tape session information. Notifications based on user selected tape session characteristics can also be provided. Systems of some embodiments can sort the sessions by performance and list the worst performing sessions for the user. Users can analyze this tape session information to identify low performing sessions. For example, the user (e.g., the library administrator) can determine the source of the data that was being backed up during the low performing session. The user can improve the data connection speed between the data source and the tape drive. The next time the same data source writes to a tape, the user can examine the speed of the new tape session to verify whether system performance improved. By eliminating the low performing sessions, the user can forestall purchase of new library equipment by getting more performance out of existing equipment.

Embodiments of the disclosure provide many advantages. For instance, some embodiments allow the user to determine the performance of a set of tapes and tape drives. For another example, some embodiments allow the user to identify low performing tape sessions and eliminate the causes thereof from the back up environment. The identification of low performing sessions also allows users to identify inefficiencies in backup jobs. Users may also improve the performance of components in the backup system. Other advantages include allowing users to identify data sources that can be backed up by a drive closer to the data source. Still further advantages include allowing users to improve the time it takes to complete a set of back ups and to avoid damaging drives by running the drives below their recommended streaming rates. Overall back up performance can also be improved by identifying the worst sessions and eliminating the causes thereof.

BRIEF DESCRIPTION OF THE FIGURES

A more complete understanding of the disclosure and the advantages thereof may be acquired by referring to the following description, taken in conjunction with the accompanying drawings in which like reference numbers generally indicate like features and wherein.

DETAILED DESCRIPTION

Preferred embodiments of the disclosure are illustrated in the FIGURES, like numerals being used to refer to like and corresponding parts of the various drawings.

Various embodiments provide a method and system for classifying information from monitoring media drives based on when a media is in a media drive. By monitoring tape sessions, the degradation and reliability of system components can be monitored, allowing unreliable or unacceptably degraded components to be identified, thus allowing for the unreliable or degraded components to be bypassed or replaced, enhancing the reliability of the system and proactively preventing data loss.

Figure 1:
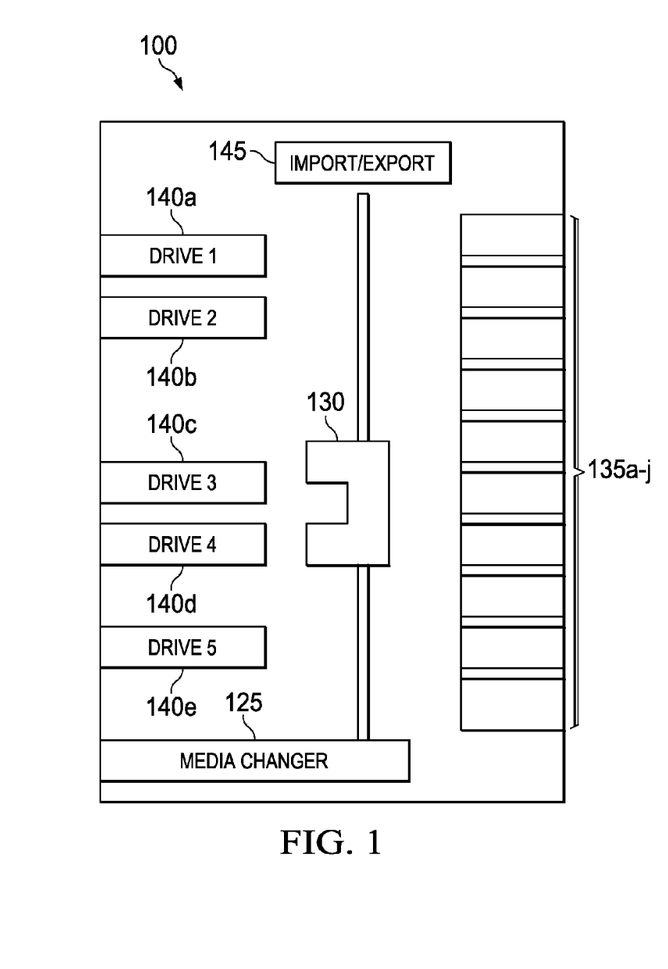
FIG. 1 is a diagrammatic representation of one embodiment of a library.

Embodiments can be utilized in conjunction with monitoring systems for various media including magnetic tapes and optical disks. While various embodiments are disclosed with reference to tape systems, embodiments can be used with other media systems. FIG. 1 is a diagrammatic representation of one embodiment of a tape library, as would be understood by one of ordinary skill in the art. Library 100 can comprise drives 140*a*-140*e*, media changer 125 and associated robot 130, import/export element(s) 145 and slots 135*a*-135*j*. Drives 140*a*-140*e* can read/write data from/to magnetic tape (contained within cartridges), eject tape cartridges, and perform other operations. Slots 135*a*-135*j* store the magnetic tape cartridges when they are not in a drive and robot 130 moves the magnetic tape cartridges between drives 140a-140e and slots 135a-135j. For example, robot 130 may move a tape cartridge stored at slot 135a to drive 140b so that data can be written to the tape cartridge. It should be noted that some libraries may employ a single robot or multiple robots in an expandable or modular configuration.

A Read Element Status (RES) command is a command which is used to poll the state of a library. That is, a RES command is sent to a library and in response, the library returns its current state, including the locations of individual tape cartridges. Thus, a RES command provides a snapshot of a library at any one time. Examples of a RES command can be found in section 6.5 of NC ITS T10/999D Revision 10a Specification, section 6.10 of INCITS T10/1383D Revision 7 Specification and section 6.10 of INCITS T10/1730-D Revision 5 Specification; all of the above-mentioned Specifications (the "T10" specifications) are hereby incorporated by reference.

A Read Media Serial Number (RMSN) command is a command which is used to determine the serial number of a tape in a drive. The RMSN command is sent to a drive and in response, the drive returns the vendor assigned serial number of the tape, if a tape is in the drive. If the tape has no serial number, the response indicates that no serial number is present even though a tape is in the drive. If the drive contains no tape, the response includes an indication that no media is present in the drive (a.k.a. as a "Check Condition" response). Examples of a RMSN command can also be found in the T10 specifications.

A Log Sense (LS) command is a command which is used to obtain data associated with a particular drive. A LS command is sent to a particular drive of a library and in response, the drive returns data associated with the drive and/or the media contained in the drive depending on the actual LS command. For example, such data might include: read errors, write errors, utilization and performance data, data regarding the data written and read to a media, media loaded, detail tables or other data. In one embodiment, the amount of data written over a period of time may be derived from data returned in response to one or more LS commands. More specifically, data returned in response to an LS command may include Log Sense page 0xC, 0x32 or 0x39 which may include data from which the amount of data written by a particular drive over a period of time may be derived (e.g. calculated), Examples of a LS command can be found in "SCSI Primary Commands-3 (SPC-3)", (Project T10/1416-D), Revision 22a, Mar. 25, 2005, propagated by the T10 Technical Committee of the InterNational Committee on Information Technology Standards (INCITS), which is hereby incorporated by reference.

An Inquiry command is a command that is used to query relatively static information (e.g. serial number, manufacturer or other relatively static information) from components of a library such as a drive or a media changer. According to one embodiment, Inquiry commands are used to query individual library components. That is, an individual Inquiry command may query a particular library component. Examples of an Inquiry command can be found in "SCSI Primary Commands-3 (SPC-3)", (Project T10/1416-0), Revision 22a, Mar. 25, 2005, propagated by the T10 Technical Committee of the InterNational Committee on Information Technology Standards (INCITS), referenced above. Embodiments of the invention can utilize a monitoring appliance which can be a Read Verify Appliance (RVA). The monitoring appliance polls the state of a library over time by sending RES commands to the library at intervals. Returned library states are compared. Based on the comparison between the returned library states, the movement of tape cartridges over time can be tracked and the beginning and ending of tape sessions can be identified. One example of tracking movement of media is found in U.S. patent application Ser. No. 11/801,809, entitled Method And System For Non-Intrusive Monitoring Of Library Components by Foster et al. and filed on May 11, 2007 which is incorporated herein as if set forth in full.

Various embodiments identify tape (or other media) sessions which represent the period of time that a tape is in a tape drive or other selected location. Tracking tape sessions allows sources of errors to be identified. For example, an individual tape cartridge may suffer from an increasing number of data errors in any drive: this implies that the tape cartridge is degrading and may require replacement. In another example, a tape cartridge may encounter errors when used with a tape drive A but may encounter no errors when used with other tape drives. If other tape cartridges encounter errors when used with tape drive A, but encounter no errors when used with other tape drives, this implies that tape drive A is unreliable. Accordingly, tape drive A may be bypassed or replaced. Some errors, though, do not appear to correlate to either a particular tape or to a particular drive. In many instances, these types of errors may correlate with influences external to the tapes and tape drives. By tracking tape sessions, errors can be correlated to these other influences.

Figure 2:
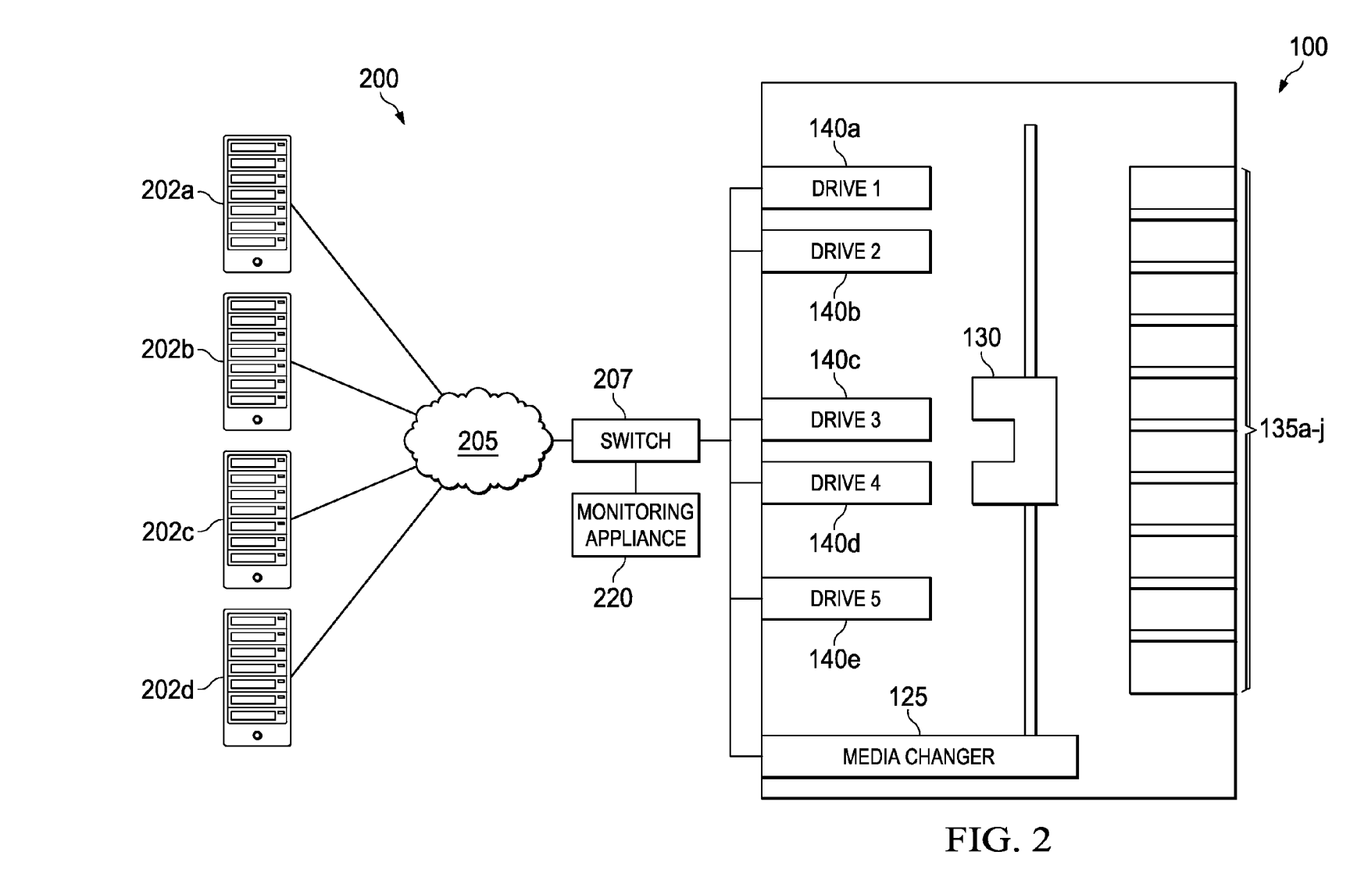
FIG. 2 is a diagrammatic representation of one embodiment of a backup system using a library and having a monitoring appliance.

FIG. 2 is a diagrammatic representation of a system 200 in which a plurality of hosts 202a-202d have access to library 100 over network 205. Network 205 can comprise the Internet, a SAN, a LAN, a WAN, a wireless network, or any other communications network known in the art. Hosts 202a-202d are coupled to library 100 via network 205 and switch 207. Similarly, library 100 can communicate with switch 207 over any suitable communications link or network known in the art and can use additional protocols such as iSCSI, TCP/IP, or other protocol known in the art. Switch 207 is connected to monitoring appliance 220.

Switch 207 is connected to library 100. Thus, switch 207 can forward RES commands from monitoring appliance 220 to library 100. Switch 207 receives the library state generated in response to the RES command from library 100 and forwards the library state to monitoring appliance 220 which stores the library state and/or compares it with one or more previous library states. Thus monitoring appliance 220 can continually poll the state of library 100, track tape movements and monitor the components of library 100. It should be noted that the intervals between polling can be fixed periods of time or of variable duration or a combination of the two. In one embodiment, the monitoring appliance polls a library every 30 seconds. In another embodiment, the time duration between polling is less than the backup time or the tape movement time. In embodiments of the invention, the intervals can be determined by computer algorithm or user input. Because monitoring appliance 220 tracks tape movements using RES commands, monitoring appliance 220 does not need to intercept commands or responses from network 205 to track tape movements. Thus, in one embodiment, monitoring appliance 220 can be an out-of-band appliance. This allows monitoring appliance 220 to be a non-intrusive device which does not monitor or interfere with commands from and responses to hosts 202a-202d. Consequently, monitoring appliance 220 can be a compartmentalized device which can be coupled to a switch and which does not have to be integrated into network 205. An advantage of this out-of-band methodology is that a monitoring appliance can be used to monitor library components without cumbersome configuring.

While shown as a physical media library in FIG. 2, library 100 can be a virtual media library that is a virtual representation of one or more physical media libraries as presented by switch 207, a library controller, or other component. Examples of library virtualization are described in U.S. patent application Ser. No. 10/704,265, entitled SYSTEM AND METHOD FOR CONTROLLING ACCESS TO MULTIPLE PHYSICAL MEDIA LIBRARIES, and U.S. patent application Ser. No. 10/703,965, entitled SYSTEM AND METHOD FOR CONTROLLING ACCESS TO MEDIA LIBRARIES, both of which are hereby incorporated by reference herein.

Figure 3:
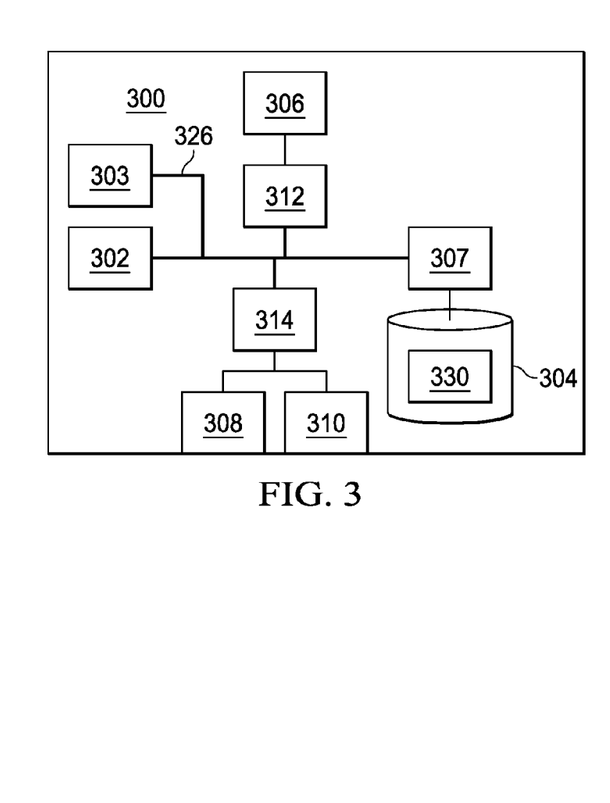
FIG. 3 is a diagrammatic representation of one embodiment of a controller which can be used in a monitoring appliance.

FIG. 3 is a diagrammatic representation of a monitoring appliance Controller 300 ("controller 300"). Controller can include a processor 302, such as an Intel Pentium 4 based processor (Intel and Pentium are trademarks of Intel Corporation of Santa Clara, Calif.), a primary memory 303 (e.g., RAM, ROM, Flash Memory, EEPROM or other computer readable medium known in the art) and a secondary memory 304 (e.g., a hard drive, disk drive, optical drive or other computer readable medium known in the art). A memory controller 307 can control access to secondary memory 304. Controller 300 can comprise a communications interface 306 (e.g., fibre channel interface, Ethernet port or other communications interface known in the art) to connect controller 300 to switch 207. An I/O controller 312 can control interactions with switch 207. Similarly, an I/O controller 314 can control interactions over I/O interfaces 308 and 310. Controller 300 can include a variety of input devices. Various components of controller 300 can be connected by a bus 326.

Secondary memory 304 can store a variety of computer instructions that include, for example, an operating system such as a Windows operating system (Windows is a trademark of Redmond, Wash. based Microsoft Corporation) and applications that run on the operating system, along with a variety of data. More particularly, secondary memory 304 can store a software program 330 that monitors tape sessions. During execution by processor 302, portions of program 330 can be stored in secondary memory 304 and/or primary memory 303.

Figure 4:
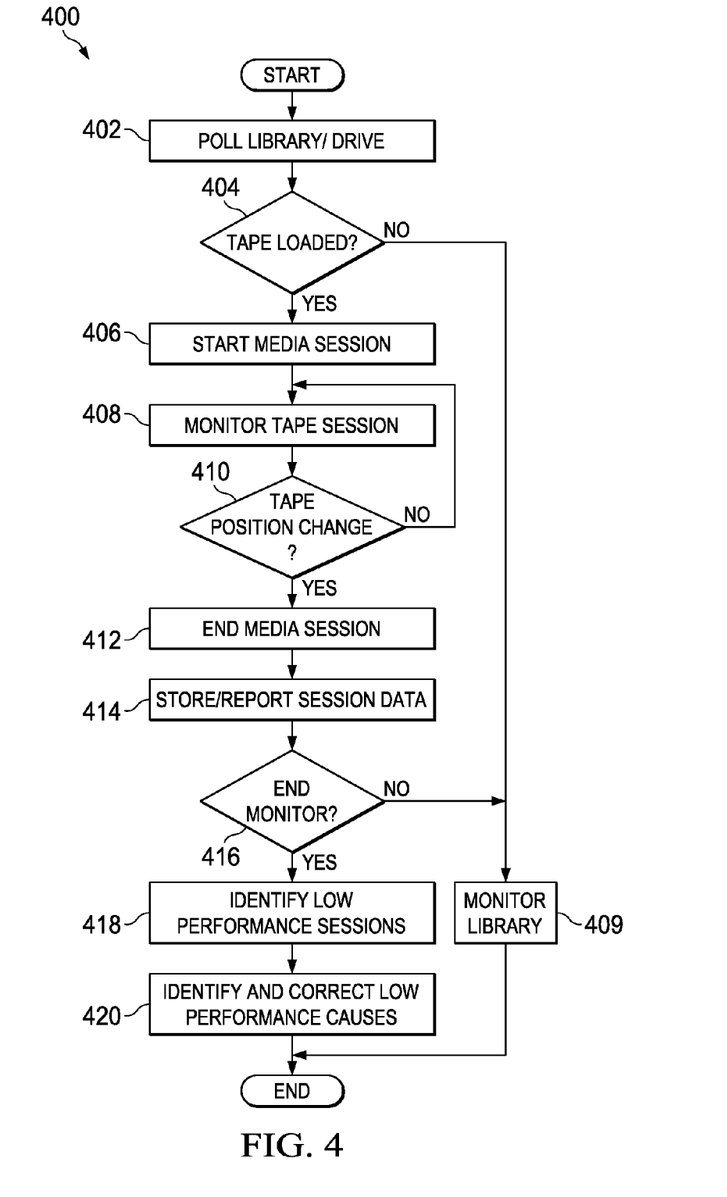
FIG. 4 is a flowchart illustrating an embodiment of a method for monitoring libraries.

FIG. 4 is a flow chart illustrating method 400 for monitoring tape sessions associated with library 100 or individual tape drives 130. Method 400 can begin with monitoring appliance 220 of FIG. 2 polling library 100 via a RES command (for example) at step 402. In response to the poll of step 402, library 100 returns a snapshot of the status of the components of library 100 including information regarding slots 135, drives 140, and the tapes therein. Successive polls of library 100 can be compared at step 404. If the current poll, when compared with the previous poll, indicates that a tape has been loaded into a drive 140 a new tape session may be initiated at step 406. Monitoring application 220 may receive the tape number, the tape drive 140 number, and the tape drive 140 serial number involved in the information returned with the RES command response. If no tape has been loaded, then monitoring appliance 220 can continue polling library 100 as shown at step 402 until a change of status occurs with respect to the loading and unloading of tapes in to and out of drives 140. If a tape was already in drive 140, or if a tape session began at step 406, monitoring appliance 220 can monitor the tape session at step 408. In step 409 monitoring of library 100 as a whole, drives 140, or the components of library 100 can continue at all times during method 400.

Figure 8:
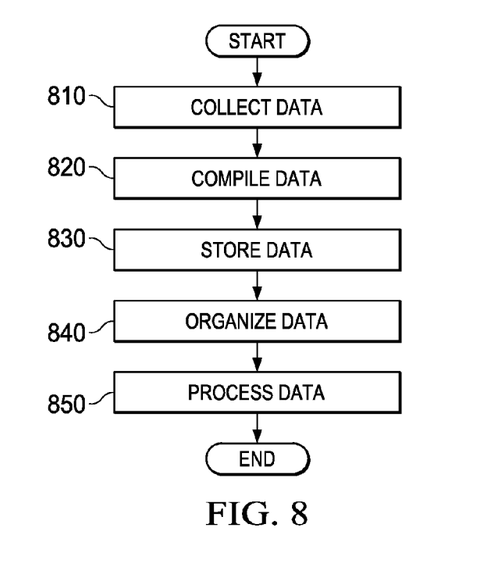
FIG. 8 is a flowchart illustrating another embodiment of a method of for monitoring libraries.

FIG. 8 is a flow chart illustrating one embodiment of a method for collecting data and organizing the collected data so that it can be accessed by or displayed to a user. According to one embodiment, the method of FIG. 8 can be implemented as a set of computer executable instructions stored on a computer readable medium at, for example, monitoring appliance 820. The set of computer executable instructions can, when executed, collect data associated with library components in a non-intrusive manner. At collect data step 810, data is collected by a monitoring appliance by querying library components of a library for data by sending commands corresponding to the library components to the library components. In response, the library components return data associated with the library components. More specifically, in one embodiment, RES, Log Sense (LS), and Inquiry commands are sent to library components and, in response, the library components return corresponding data. Data may be collected over time by collecting data from library components at intervals. For example, various commands can be sent every 10 seconds, every 20 seconds or with any other frequency. Thus, over time, library components may be queried a plurality of times, and as a result, the repository may contain data regarding library components at different points in time.

The monitoring appliance, at compile data step 820, can compile the returned data. For example, the monitoring appliance can compile the data in defined structures (e.g. XML structures or other structures). A structure may contain data associated with a library component returned in response to one or more commands (e.g. RES, LS, or Inquiry commands). For example, a XML structure can include data from RES commands and serial numbers of library components determined from Inquiry commands issued to corresponding library components. At store data step 830, the monitoring appliance stores the returned data in a repository. Storing data in a repository may comprise storing structures in the repository or may comprise unpacking returned data compiled at compile step 820 and storing the data in the repository. In one embodiment, the data may be stored in records in a database at the repository.

At organize data step 840, the data in the repository is organized. As part of step 840, data in the repository can be arranged in chronological order and/or superfluous or redundant data can be purged. Corresponding data can be grouped together. For example, data structures corresponding to a particular drive may be arranged in chronological order within the repository.

At process data step 850, data in the repository may be processed to display desired data to a user. For example, a user may only want to see data corresponding to a particular library component. At process data step 850, the data in the repository is processed such that the desired data is selected to be displayed to a user. Similarly, data may be processed into graphs or charts, or in accordance with any number of purposes or user desires.

In one embodiment, processing data in the repository can comprise comparing returned library states or data regarding the locations of individual tape cartridges stored in the repository to track the movement of one or more tape cartridges. For example, data in the repository corresponding to different times can be compared and the movement of tape cartridges in a library tracked by differencing the locations of tape cartridges in a library at different times. In embodiments in which data is stored in records in a database, records associated with different times may be compared to track the movement of tape cartridges. Processing data can further comprise correlating errors with a particular library component based on the movement of one or more tape cartridges within the library. Additional information regarding monitoring libraries is disclosed in U.S. patent application Ser. No. 11/801,809 entitled Method and System for Non-Intrusive Monitoring of Library Components by Foster et al and filed on May 11, 2007 and of U.S. patent application Ser. No. 12/024,755 entitled Media Library Monitoring System And Method by Sims and filed on Feb. 1, 1998, now U.S. Pat. No. 7,908,366, which is incorporated herein as if set forth in full.

Figure 5:
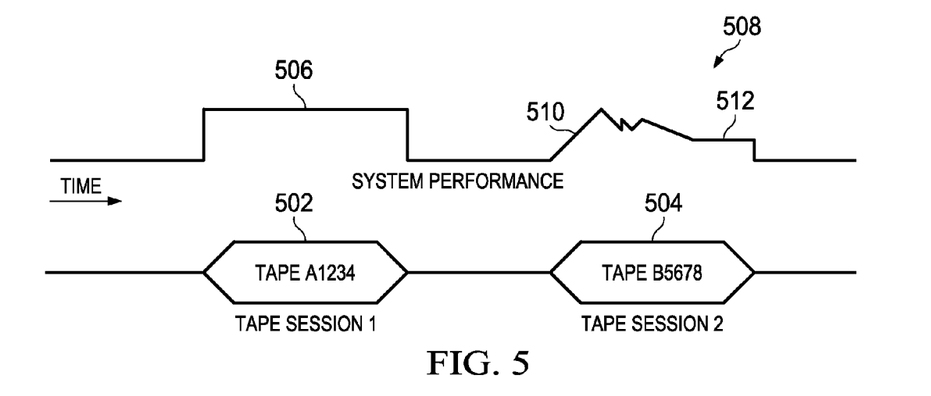
FIG. 5 is a diagrammatic representation of a tape session.

Performance monitored in accordance with the embodiment of FIG. 8, or other methods of monitoring performance data, can be correlated with tape sessions in some embodiments. Turning briefly to FIG. 5, FIG. 5 illustrates two tape sessions 502 and 504 and performance 505 and 508 associated therewith. As FIG. 5 shows, tapes A1234 and B5678 were involved in tape sessions 502 and 504. Tape session 502 shows a higher and steady performance 506 when compared to the lower and erratic performance 508 of tape session 504. Performance 508 exhibits a peak 510 after a gradual build up and shifting low-level performance thereafter which leads to a low performance plateau 512 with which tape session 504 ends. Tape session 504 may adversely affect the performance of system 200 of FIG. 2 whether the cause of the low performance of tape session 504 is the tape, the drive 140, or some other factor either internal or external to library 100. For instance, any of a number of components of system 200 could slow the data delivery rate to library 100.

Returning to FIG. 4, monitoring appliance 220 can continue monitoring performance 506 and 508 of library 100 until, at step 410, when it detects that the tape involved in tape session 502 and 504 is unloaded from the drive 140. Monitoring appliance 220 may then end (at step 412) tape session 502 or 504 depending on which tape A1234 or B5678 moved. The performance information gathered during tape session 502 or 504 may be output, stored, or further processed at step 414. If the user desires no further tape session monitoring, step 416 shows that monitoring application 220 of FIG. 2 may stop monitoring library 100. If the user wishes to continue monitoring tape sessions, step 416 shows that such monitoring may continue by returning to step 402 and cycling through selected portions of method 400 to detect tape loads and unloads and to monitor performance during tape sessions.

Users can review performance 506 and 508 related information gathered during tape sessions 502 and 504 to identify low performance tape sessions such as tape session 504 at step 418. Users can also identify the causes for the low performance session 504 at step 420 from information gathered during tape sessions 502 and 504 as well as other information available to the users. For instance, if tape session 504 was associated with host 202b of FIG. 2 and shows low performance 508, host 202b and system 200 components between host 202b and library 100 may be examined to determine if they might be the cause of low performance 508. Underperforming portions of system 200 may be replaced to improve performance 508.

Figure 6:
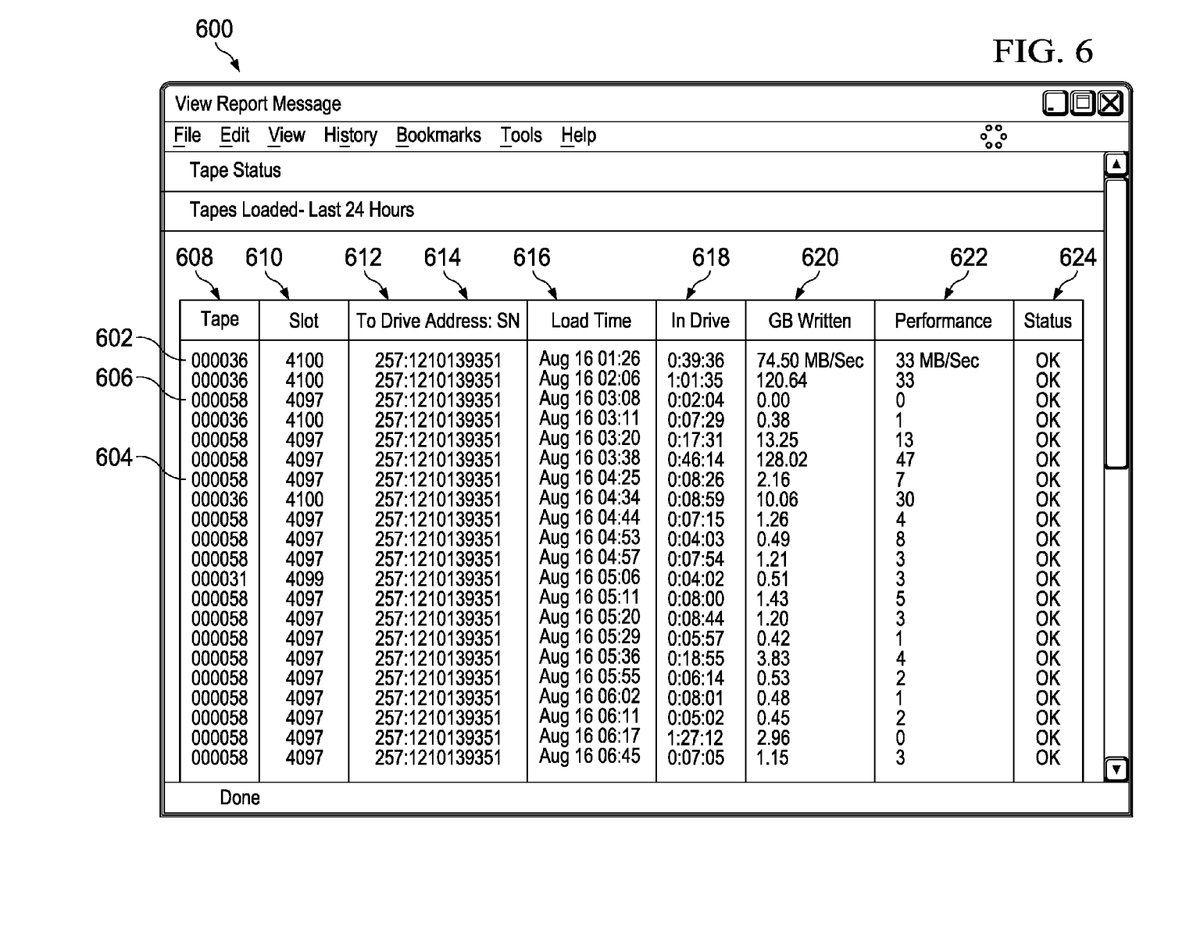
FIG. 6 illustrates a report of a monitoring appliance.
Figure 7:
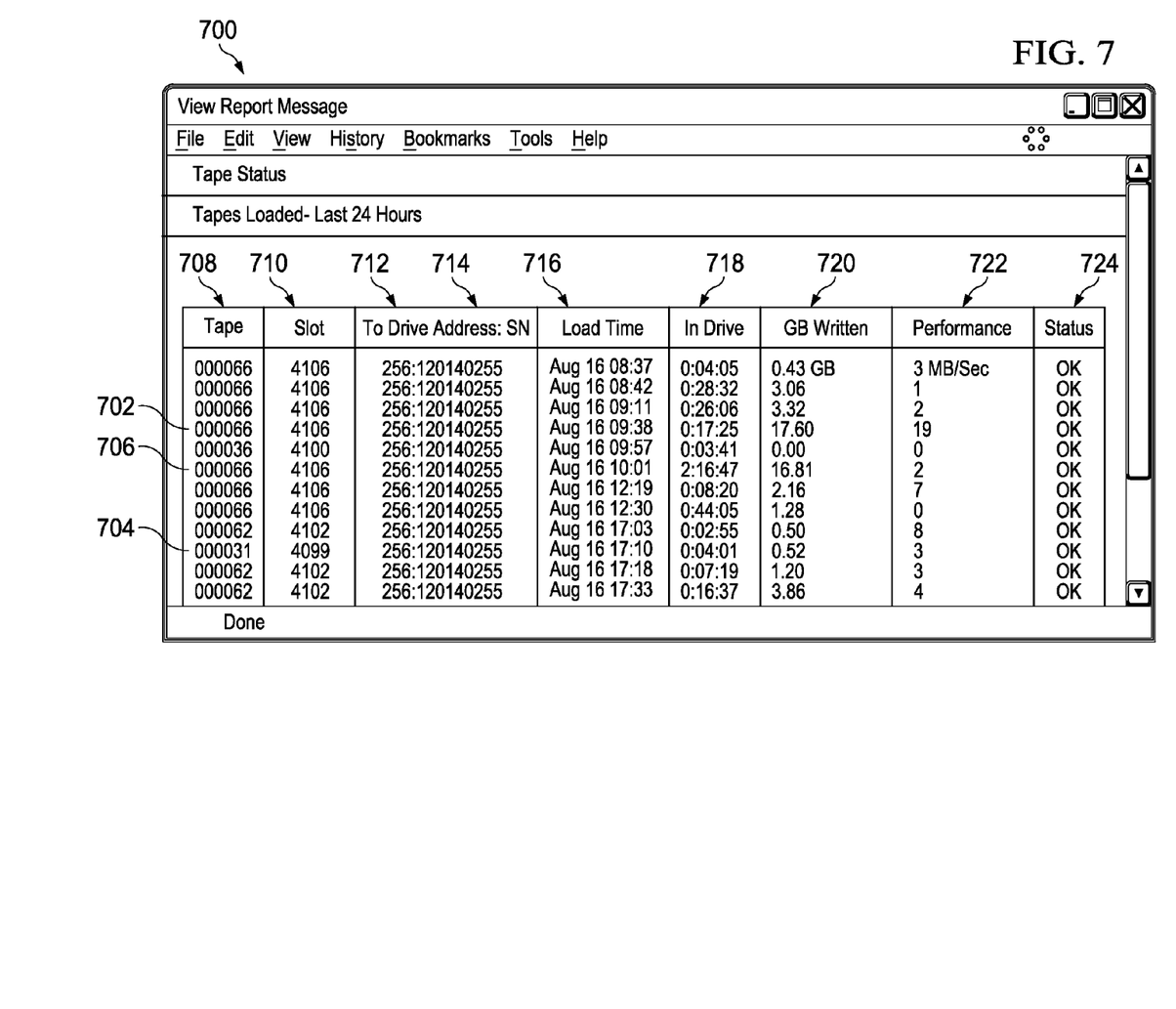
FIG. 7 illustrates another report of a monitoring appliance.

FIGS. 6 and 7 show reports 600 and 700 which monitoring appliance 220 may display for users of system 200. FIG. 6 shows a tape status report 600 for the last 24 hours for library 100 and FIG. 7 shows tape status report 700 for the last 24 hours for a single drive 140. Report 600 can be sorted by time of tape insertion into a drive and shows performance data associated with a collection of drives. Each line of report 600 can represent a tape session such as tape sessions 602, 604, and 606. Report 600 can also display, for each tape session 602, 604, and 606, the identity 608 of a tape in a drive, the slot 610 in which the tape is stored when not in use, the drive number 612 of the drive involved, the serial number 614 of the drive, the time 616 at which the tape was loaded, the total time 618 during which the tape was loaded in the drive, the amount of data 620 read to or written from the tape, performance 622 (here data transfer rate in GBytes), and the overall status 624 of tape session 602, 604, or 606.

FIG. 6 illustrates a query from a database in to which information obtained from polling library 100 is stored. For instance, tape identities 608 may originate from bar code tags on the tapes. For another example, slot numbers 610 can correspond to slots 135 of FIG. 2. In-drive time 618 can be computed by subtracting the clock time of the poll which detected the beginning of session 602, 604, or 606 from the clock time of the poll which detected the ending of tape session 602, 604, or 606. Another way in which in-drive time 620 can be calculated is to subtract the times reported by library 100 at which a tape was loaded and unloaded for tape sessions 602, 604, or 606. Many other types of performance information can be reported in report 600. For instance, instead of reporting amount of data transferred 620, the number of read or write errors could be reported. Another example of information which may be reported is performance 622 which is shown as a rate determined by dividing data amount 620 by in-drive time 618. For instance, tape session 602 is shown as having a performance 622 of 33 MB/sec. Tape session 604 shows performance 622 of 7 MB/sec. Tape session 606 illustrates a case in which performance 622 was 0 MB/Sec.

Other performance related information may be reported by report 600 such as the room temperature, room humidity, or the personnel on call during various tape session 602, 604, and 606. Tape session status 624 could correspond to the status of tape drive 140, the tape, library 100, etc. Tape session status 624 could also report information such as the number of errors which occurred during tape sessions 602, 604, or 606. Other features of report 600 could serve to call attention to information reported therein. For instance, if the number of errors during a session rose beyond a user selected limit, the row of report 600 corresponding to relevant tape session 602, 604, or 606 could be color coded, could be configured to flash, or could be configured to draw attention to itself in some other manner.

Users can peruse information 608, 610, 612, 614, 616, 618, 620, 622, and 624 (for example) in report 600 and identify low performing sessions 606. Users can also correct or optimize system 200 performance related to low performance tape session 606. Such activity can obviate the desire to purchase additional libraries 100 when library 100 may not be the reason for low performance tape sessions 606. For instance, library 100 to which FIG. 6 pertains has a specified data transfer rate of 80 MB/sec. An inspection of FIG. 6 reveals that only a few tape sessions achieved even about half of the specified rate. Reports such as report 600 can reveal many other aspects of system 200 performance. For instance, while some back up operations can span several tapes, FIG. 6 reveals that library 100 loaded and unloaded tape number 00058 numerous times. It is possible that determining why such activity occurred might reveal an aspect of system 200 which could be corrected or optimized.

FIG. 7 illustrates that for a single tape drive (of library 200 or a stand-alone drive) report 700 can be a list of tapes that were loaded into the drive. In FIG. 7, report 700 is sorted by the time the tapes were loaded in to drives 140. Monitoring appliance 200 could also generate reports such as reports 600 or 700 for each individual tape in system 200 showing when the tapes were loaded into each of a variety of drives 140. Appliance monitor 220 could also display additional information regarding the tapes, drives 130, and tape sessions 502 and 504. For example, performance curves 506 and 508 of FIG. 5 could be displayed with reports 600 and 700. For another example, monitoring appliance 220 could display which tapes were in which drives 140 during the time that the data for performance curves 506 and 508 were gathered. In some embodiments, reports 600 and 700 and other performance related information can be delivered by a world-wide-web based interface, e-mail, SCSI or SNMP reporting mechanisms, etc.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example", "for instance", "e.g.", "in one embodiment".

Although embodiments have been described in detail herein, it should be understood that the description is by way of example only and is not to be construed in a limiting sense. It is to be further understood, therefore, that numerous changes in the details of the embodiments and additional embodiments will be apparent, and may be made by, persons of ordinary skill in the art having reference to this description. It is contemplated that all such changes and additional embodiments are within scope of the claims below.

What is claimed is:

1. A monitoring system comprising:
    a communications interface configured to connect to a communications link;
    a processor;
    a non-transitory computer readable medium storing a set of computer instructions executable to perform a method comprising:
        sending commands to a media changer of a media library system using a native command set of the media changer of the media library system to collect position information from the media changer, wherein the monitoring system is external to, and independent of data accesses commands from hosts to, the media library system;
        collecting performance information from one or more drives of the media library system with the monitoring system by sending commands to one or more drives of the media library system using a native command set of the one or more drives;
        defining a set of media sessions, each media session corresponding to a different media/drive/time period combination, wherein the time period of each media session is based on the position information and begins when a media of a corresponding media/drive combination is loaded in a drive of the corresponding media/drive combination and ends when the media in the corresponding media/drive combination is next unloaded from the drive of the corresponding media/drive combination;
        for each media session in the set of media sessions, determining a set of media session performance data from the performance information collected from the drive of the media/drive combination corresponding to that media session during the time period of that media session; and
        associating the set of media session performance data with the media and drive of the media/drive combination corresponding to that media session.

2. The monitoring system of claim 1, wherein sending commands to the media changer of the media library system comprises sending Read Element Status commands to the media changer; and
    sending commands to one or more drives of the media library system comprises sending Log Sense commands to the one or more drives.

3. The monitoring system of claim 1, wherein the set of media session performance data for a media session comprises a rate of data transfer at the drive of the media/drive combination corresponding to the media session.

4. The monitoring system of claim 1, wherein the media library system is a magnetic tape library system and the media comprise magnetic tapes.

5. The monitoring system of claim 1, wherein the monitoring system is an out-of-band performance monitoring system.

6. The monitoring system of claim 1, wherein the set of computer instructions are further executable to create a list of media sessions sorted by performance.

7. A method for monitoring performance of a media library system comprising:
    sending commands to a media changer of the media library system from a monitoring system that is external to, and independent of data accesses commands from hosts to, the media library system using a native command set of the media changer of the media library system to collect position information from the media changer;
    collecting performance information from one or more drives of the media library system with the monitoring system by sending commands to one or more drives of the media library system using a native command set of the one or more drives;
    defining a set of media sessions, each media session corresponding to a different media/drive/time period combination, wherein the time period of each media session is based on the position information and begins when a media of a corresponding media/drive combination is loaded in a drive of the corresponding media/drive combination and ends when the media in the corresponding media/drive combination is next unloaded from the drive of the corresponding media/drive combination;
    for each media session in the set of media sessions, determining a set of media session performance data from the performance information collected from the drive of the media/drive combination corresponding to that media session during the time period of that media session; and
    associating the set of media session performance data with the media and drive of the media/drive combination corresponding to that media session.

8. The method of claim 7, wherein sending commands to the media changer of the media library system comprises sending Read Element Status commands to the media changer; and sending commands to one or more drives of the media library system comprises sending Log Sense commands to the one or more drives.

9. The method of claim 7, wherein the set of media session performance data for a media session comprises a rate of data transfer at the drive of the media/drive combination corresponding to the media session.

10. The method of claim 7, wherein the media library system is a magnetic tape library system and the media comprise magnetic tapes.

11. The method of claim 7, wherein the monitoring system is an out-of-band performance monitoring system.

12. The method of claim 7, further comprising creating a list of media sessions sorted by performance.

13. The method of claim 7, further comprising when the performance is slow, determining whether a cause of slow performance is external to the media library.

14. The method of claim 7, further comprising correcting an external cause of the slow performance.

15. The method of claim 7, further comprising connecting the monitoring system to the media library system through a switch such that the monitoring system is out of band with hosts connected to the media library system.

16. A computer program product comprising a non-transitory computer readable medium storing a set of computer executable instructions executable to perform a method comprising:
sending commands to a media changer of a media library system from a monitoring system that is external to, and independent of data accesses commands from hosts to, the media library system using a native command set of the media changer of the media library system to collect position information from the media changer;
collecting performance information from one or more drives of the media library system with the monitoring system by sending commands to one or more drives of the media library system using a native command set of the one or more drives;
defining a set of media sessions, each media session corresponding to a different media/drive/time period combination, wherein the time period of each media session is based on the position information and begins when a media of a corresponding media/drive combination is loaded in a drive of the corresponding media/drive combination and ends when the media in the corresponding media/drive combination is next unloaded from the drive of the corresponding media/drive combination;
for each media session in the set of media sessions, determining a set of media session performance data from the performance information collected from the drive of the media/drive combination corresponding to that media session during the time period of that media session; and
associating the set of media session performance data with the media and drive of the media/drive combination corresponding to that media session.

17. The computer program product of claim 16, wherein sending commands to the media changer of the media library system comprises sending Read Element Status commands to the media changer; and
sending commands to one or more drives of the media library system comprises sending Log Sense commands to the one or more drives.

18. The computer program product of claim 16, wherein the set of media session performance data for a media session comprises a rate of data transfer at the drive of the media/drive combination corresponding to the media session.

19. The computer program product of claim 16, wherein the media library system is a magnetic tape library system and the media comprise magnetic tapes.

20. The computer program product of claim 16, wherein the monitoring system is an out-of-band performance monitoring system.

21. The computer program product of claim 16, wherein the set of computer instructions are further executable to create a list of media sessions sorted by performance.

22. A system comprising:
a media library system comprising:
a media changer;
one or more drives;
a monitoring system external to, and independent of data accesses commands from hosts to, the media library system and connected to the media library system, the monitoring system configured to:
send commands to a media changer of the media library system using a native command set of the media changer of the media library system to collect position information from the media changer;
collect performance information from the one or more drives of the media library system by sending commands to one or more drives of the media library system using a native command set of the one or more drives;
define a set of media sessions, each media session corresponding to a different media/drive/time period combination, wherein the time period of each media session is based on the position information and begins when a media of a corresponding media/drive combination is loaded in a drive of the corresponding media/drive combination and ends when the media in the corresponding media/drive combination is next unloaded from the drive of the corresponding media/drive combination;
for each media session in the set of media sessions, determine a set of media session performance data from the performance information collected from the drive of the media/drive combination corresponding to that media session during the time period of that media session; and
associate the set of media session performance data with the media and drive of the media/drive combination corresponding to that media session.

23. The system of claim 22, wherein sending commands to the media changer of the media library system comprises sending Read Element Status commands to the media changer; and
sending commands to one or more drives of the media library system comprises sending Log Sense commands to the one or more drives.

24. The system of claim 22, wherein the set of media session performance data for a media session comprises a rate of data transfer at the drive of the media/drive combination corresponding to the media session.

25. The system of claim 22, wherein the media library system is a magnetic tape library system and the media comprise magnetic tapes.

26. The system of claim 22, wherein the monitoring system is an out-of-band performance monitoring system.

27. The system of claim 22, wherein the monitoring system is further configured to create a list of media sessions sorted by performance.

* * * * *